United States Patent
Heep et al.

[11] Patent Number: 6,102,578
[45] Date of Patent: Aug. 15, 2000

[54] CELLULAR WHEEL SLUICE WITH SUPPLEMENTARY BEARING

[75] Inventors: Dieter Heep; Michael Heep, both of Weingarten, Germany

[73] Assignee: Motan-Fuller verFahrenstechnik GmbH, Weingarten, Germany

[21] Appl. No.: 09/245,324

[22] Filed: Feb. 5, 1999

[51] Int. Cl.[7] .............................. F16C 13/00; G01F 11/10
[52] U.S. Cl. ......................... 384/549; 222/367; 222/370
[58] Field of Search .......................... 384/549; 222/367, 222/368, 370

[56] References Cited

U.S. PATENT DOCUMENTS

| | | | |
|---|---|---|---|
| 2,893,542 | 7/1959 | Watkins et al. | 384/549 X |
| 4,784,298 | 11/1988 | Heep et al. | 222/350 |
| 4,948,017 | 8/1990 | Heep et al. | 222/368 |
| 5,341,966 | 8/1994 | Blankmeiser et al. | 222/370 |
| 5,392,964 | 2/1995 | Stapp et al. | 222/368 |
| 5,620,116 | 4/1997 | Kluger et al. | 222/368 |
| 5,887,986 | 3/1999 | Pouliquen et al. | 384/549 |

*Primary Examiner*—Thomas R. Hannon

[57] ABSTRACT

A cellular wheel sluice, comprising a housing with an inlet opening and an outlet opening, side covers, a cellular wheel with a shaft, and the bearing of the shaft with fixed and loose bearing.

8 Claims, 9 Drawing Sheets

CELLULAR WHEEL SLUICE WITH SUPPLEMENTARY BEARING

This application claims priority from German application number 198 04 431.3, filed Feb. 5, 1998.

The invention relates to a cellular wheel sluice of the type generally comprising a housing having an inlet opening and an outlet opening, side covers, a cellular wheel with struts and side disks, which cellular wheel sluice is mounted on a shaft with bearings. In the operation of such cellular wheel sluices, sealing and the exact bearing of cellular wheels in systems that operate with different pressure pressures present problems. The pressure difference causes sagging of the shaft, which has a negative effect both on tightness and on the service life of the sealing units.

The present invention achieves a marked attenuation of the disadvantages discussed.

BACKGROUND OF THE INVENTION

In cellular wheel sluices with a horizontally disposed cellular wheel, the shafts are in principle rotatably supported in the side covers disposed laterally on the housing.

The spacing between the cellular wheel bodies, which can be deformed only slightly, and the ball bearing is dependent on the selected shaft seal, radial packing ring, slide ring seal or stuffing box seal and determines the sagging of the cellular wheel shaft stub, when differential pressure is applied to the inlet or outlet of the cellular wheel sluice.

For rotating the cellular wheel in the housing, a gap is necessary, which is composed of the following criteria:

Taking into account the sagging the production tolerance the effective temperature the necessary margin of safety in all possible loading situations.

Assuming a standard gap of 0.10 to 0.25 mm, then depending on the cellular wheel diameter it will be appreciated that producing cellular wheel sluices for dense-phase feeding presents difficulties, especially given the pronounced trend toward 6-bar feeding systems, which until now have been used only for pressure vessels.

On the one hand, the bearing should be embodied as simply as possible, but on the other it must meet the demand for increasing loads.

In terms of process technology, changing the location of the cellular wheel relative to the pivot axis in the housing leads to the characteristic air leakage curves under rising pressure and when a lateral seal is used it takes considerable effort to protect the seal from the bending motion with the goal of achieving a desirably long service life.

German Patent DE 39 40 667 describes sealing struts that are guided by rollers on the housing, in order to reduce wear of the sealing struts from the bending motion and thus to relieve them from the pressure of the struts in the bending direction toward the housing.

In practice, this is feasible only for bulk goods with particles sizes of 2 ×S (where S =the gap), because the support roller would simply roll over a smaller particle size. This cancels out the seal and renders it inoperative.

SUMMARY OF THE INVENTION

The present invention has the object of eliminating the problem of bending motion in cellular wheel sluices with lateral sealing in the simplest possible way, and as much as possible using standardized parts employed in the ball-bearing industry.

This object is attained by securing at least one flange ring to the outside of each side disk of the cellular wheel, on which wheel at least one support roller attached to the housing and radially carrying the flange ring rests.

An important characteristic of the invention is that at least one flange ring is secured to the outside of each side disk of the cellular wheel, and at least one support roller attached to the housing and radially carrying the flange ring rests on the cellular wheel.

With this technical teaching, there is the substantial advantage that the cellular wheel is now reinforced, in the vicinity of its maximum sagging, by additionally disposed radial support rollers. Thus the sagging of the shaft that unavoidably occurs during operation of the cellular wheel sluice is counteracted, and this sagging is reduced by the support rollers mounted laterally on the cellular wheel that are provided according to the invention. In the ideal case, accordingly, sagging of the center longitudinal axis of the shafts of the cellular wheel is eliminated by the support rollers provided according to the invention, which press laterally against the side disk of the cellular wheel and additionally reinforce it.

This has the advantage that air leakage losses are now substantially less, because the air leakage gaps between the housing and the cellular wheel always remain at the same value; these gaps do not vary as a function of pressure.

With the additional support of the shaft of the cellular wheel by the radial support rollers according to the invention, the air leakage losses are thus minimized.

It thus becomes possible for the first time to operate such a cellular wheel sluice far above the previous feeding pressures, such as 3 bar; thus with the present invention it is possible for the first time to operate such cellular wheel sluices at pressures in the range of 6 bar and higher.

It is accordingly important that the radially provided support rollers be located as close as possible to the site of maximum sagging of the shaft of the cellular wheel. This site here is the side disk of the cellular wheel; support rollers structurally connected to the housing are provided, which accordingly support at least one flange ring, disposed solidly on the side disk, inward in the radial direction.

Depending on the pressure conditions that prevail, it may be provided that one or more support rollers 22 brace the flange ring 14 at the location that in operation represents the overpressure side in the prevailing pressure system, and that they are located as close as possible to the side disk 16 of the cellular wheel 6. This means that they are disposed counter to the pressure direction.

It is understood that the present invention also includes embodiments in which a plurality of support rollers are distributed over the circumference, in the event that lateral forces are to be expected.

With the technical teaching provided, it is contemplated that the conventional bearing of the shaft of the cellular wheel with fixed and loose bearings will be retained. These bearings are now relieved in accordance with the invention by the support rollers provided according to the invention that radially carry the cellular wheel. Hence they can be made correspondingly smaller in size, which economizes on production cost.

It is also within the scope of the present invention, along with the radial bracing of the side disk of the cellular wheel, to provide axial bracing as well, in the vicinity of the support rollers provided here.

The technical teaching of the invention accordingly resides in the bracing of the cellular wheel by means of additionally incorporating supporting and/or cam rollers with a high load-bearing capacity on the side cover; these rollers are disposed counter to the force direction or to the sagging motion of the cellular wheel, and after assembly, by adjusting any eccentric construction that may be present and eliminating any bearing play, they keep the cellular wheel in position by exerting force.

It has also been found that it can be advantageous for cellular wheels of this type, especially in the direction of 6-bar loading, to be disposed eccentrically in the first place away from the center of the housing, counter to the direction of force, in order to attain even lower air leakage values.

Under load, the cellular wheel sags back to the desired center position, thus assuring that air leakage losses will be only minimal.

If the cellular wheel is held in an eccentric position under load as well, by the support rollers, then the radial sealing would again be subjected to an undesired abrasion force.

European Patent Disclosure EP 0 462 501 describes a floatingly supported support ring, which automatically adapts to an eccentric position of the cellular wheel by overcoming the O-ring friction. Since the squeezing forces acting on the O-rings may be considerable, the displacement of the cellular wheel creates increased friction and undesired heating. This is where the invention commences; it provides that this support ring be positioned by means of additional control rollers. It is thus held without force always at the diameter of the sealing ring in order to seal off the cellular wheel from the housing.

If at least three control rollers are mounted on the flange, then the rollers control the position of the floating support ring, in terms of the preset eccentricity of the cellular wheel housing center, in such a way that no force whatever is exerted on the sealing ring, and hence there is no perceptible wear thereof.

Accordingly, one important feature of the present invention is that by the installation of additional, radially acting support rollers, the cellular wheel is braced in the region where it sags, thereby for the first time dividing the shaft bearings on the face ends; in other words, one additional bearing is provided, which relieves the bearing and performs an additional bracing function. This bracing function did not exist with the known shaft bearings.

With the second embodiment of the arrangement of a floating support ring described above, which ring is carried by control rollers distributed uniformly along the circumference, there is the advantage that this support ring adapts automatically to the eccentric position of the cellular wheel and thus attains optimal sealing from air leakage losses, because the sealing ring no longer wears down.

The subject of the present invention is attained not only from the subject of the individual claims but also from the combination of the individual claims with one another.

All of the specifications and characteristics disclosed herein, including the abstract, and in particular the three-dimensional embodiment shown in the drawings, are claimed as essential to the invention, to the extent that they are novel either individually or in combination over the prior art.

The invention is further described below in conjunction with drawings that show a plurality of possible embodiments. Other characteristics and advantages of the invention will become apparent from the drawings and their description.

DETAILED DESCRIPTION OF THE INVENTION

Figure 1:
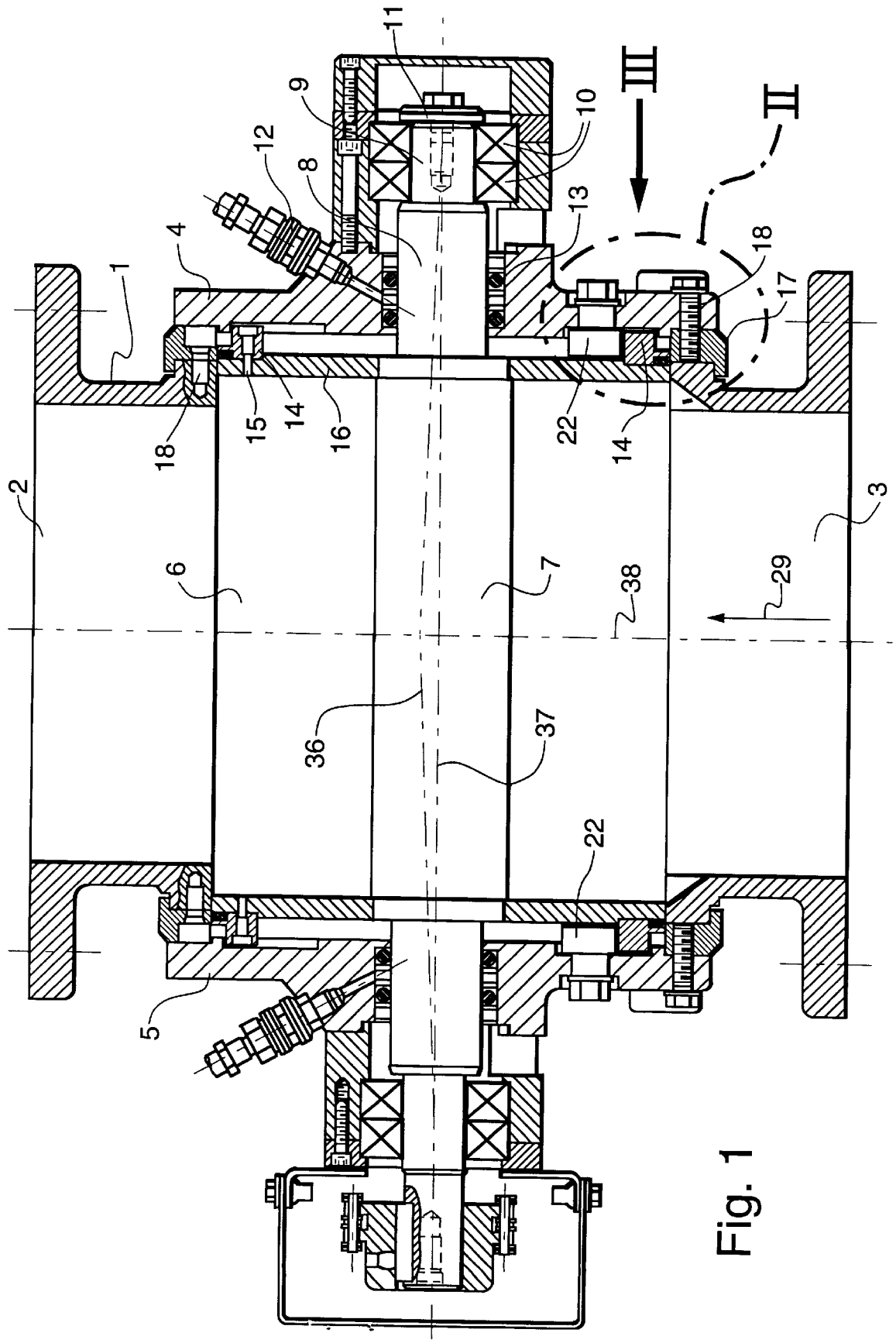
FIG. 1 illustrates a schematic section through a cellular wheel sluice according to the invention.
Figure 2:
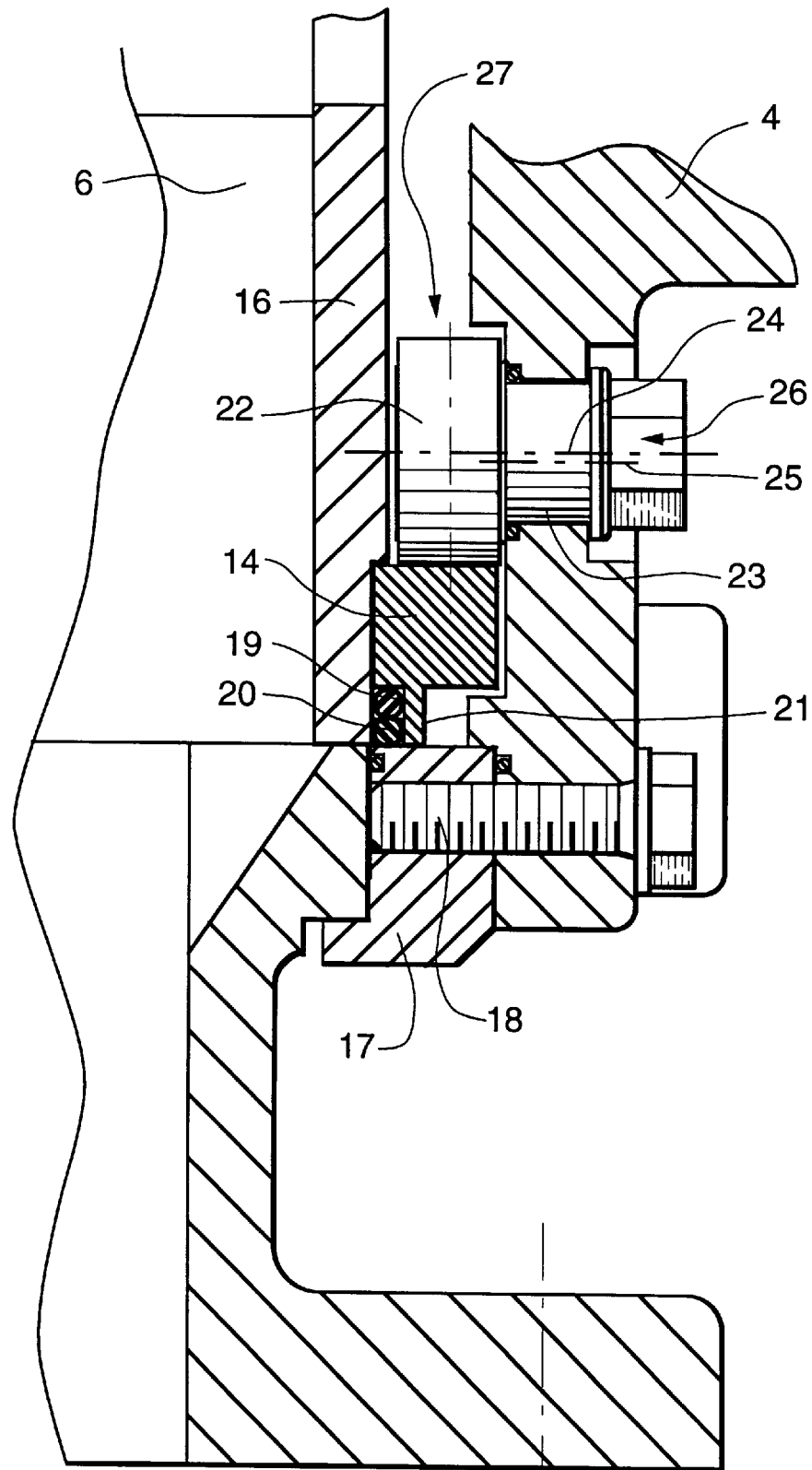
FIG. 2 illustrates a detail II of FIG. 1 showing the lower right side of the side cover of the cellular wheel.

As shown in FIGS. 1 and 2, the cellular wheel sluice comprises a housing 1, on the upper part of which is disposed an inlet 2 and on the lower part of which is disposed an outlet 3. In the interior of the housing 1, the cellular wheel 6 is rotatably supported, and in a manner known per se the cellular wheel has individual compartments, which are partitioned off from one another by associated struts 28 (see FIG. 3).

The shaft 7, which is connected to the cellular wheel 6 in a manner fixed against relative rotation, reaches through the respective side covers 4, 5 of the housing 1 and ends in a first shaft end 8, which in turn is extended in the form of a shaft stub 9. In the region of the shaft end 8, air scavenging 12 with an associated radial packing ring arrangement 13 is provided, in order to seal off the shaft end 8 from the atmosphere. The radial and axial bearing of the shaft 7 is effected here in the region of the shaft stub 9, where in the exemplary embodiment shown there are two bearings 10, one of which may be embodied as a fixed bearing and the other as a loose bearing, and the bearings are prestressed with a corresponding prestressing screw 11.

In FIG. 1, it is shown with exaggerated lines that upon an exertion of pressure in the direction of the arrow 29, the shaft 7 sags along the sagging curve 36 toward the side on which the lesser pressure acts; this has the disadvantage that on the opposite side, that is, the side acted upon by the higher pressure, the gap between the cellular wheel 6 and the housing increases, while on the side acted upon by the lesser pressure the gap between the housing 1 and the cellular wheel 2 correspondingly decreases. The gap must therefore be chosen in advance such that even when pressure is exerted during operation, undesired material contact between the cellular wheel and the housing is avoided.

This is the point of departure for the invention, and according to the invention an additional radial support of the shaft 7 is now provided, so that the sagging curve 36 shown here, at some distance above the center longitudinal axis 37, does not occur.

According to the invention, it is provided that a flange ring 14 is secured to the side of the cellular wheel 6, for instance via screws 15, and at least one support roller 22 rolls along the inside circumference of the flange ring and supports this flange ring 14 relative to the housing.

In the exemplary embodiment shown, the support roller 22 is disposed in the respective side cover 4, 5, which in turn is screwed to the housing 1 via suitable screws 18.

The details will be seen in FIG. 2.

Once the cellular wheel sluice is symmetrical to the center transverse axis 38, it suffices for the purposes of further description of the bearing for only once side of this bearing at a time to be described, since the other side is embodied precisely identically.

In FIG. 2, the lower right side of the bearing is therefore shown in accordance with detail 2; the lower left side is embodied precisely identically, It can be seen here that the flange ring 14 has a flange 21 pointing radially outward, on whose inside there are two sealing rings resting one inside the other, namely an O-ring 19 toward the inside and a piston sealing ring 20 located above it toward the outside. Both sealing rings 19, 20 serve to seal off the side shell 16 from the housing.

The support roller 22 shown may be supported here on a ball bearing, needle bearing, or barrel bearing. In the exemplary embodiment shown, it is embodied cylindrically.

Figure 9:
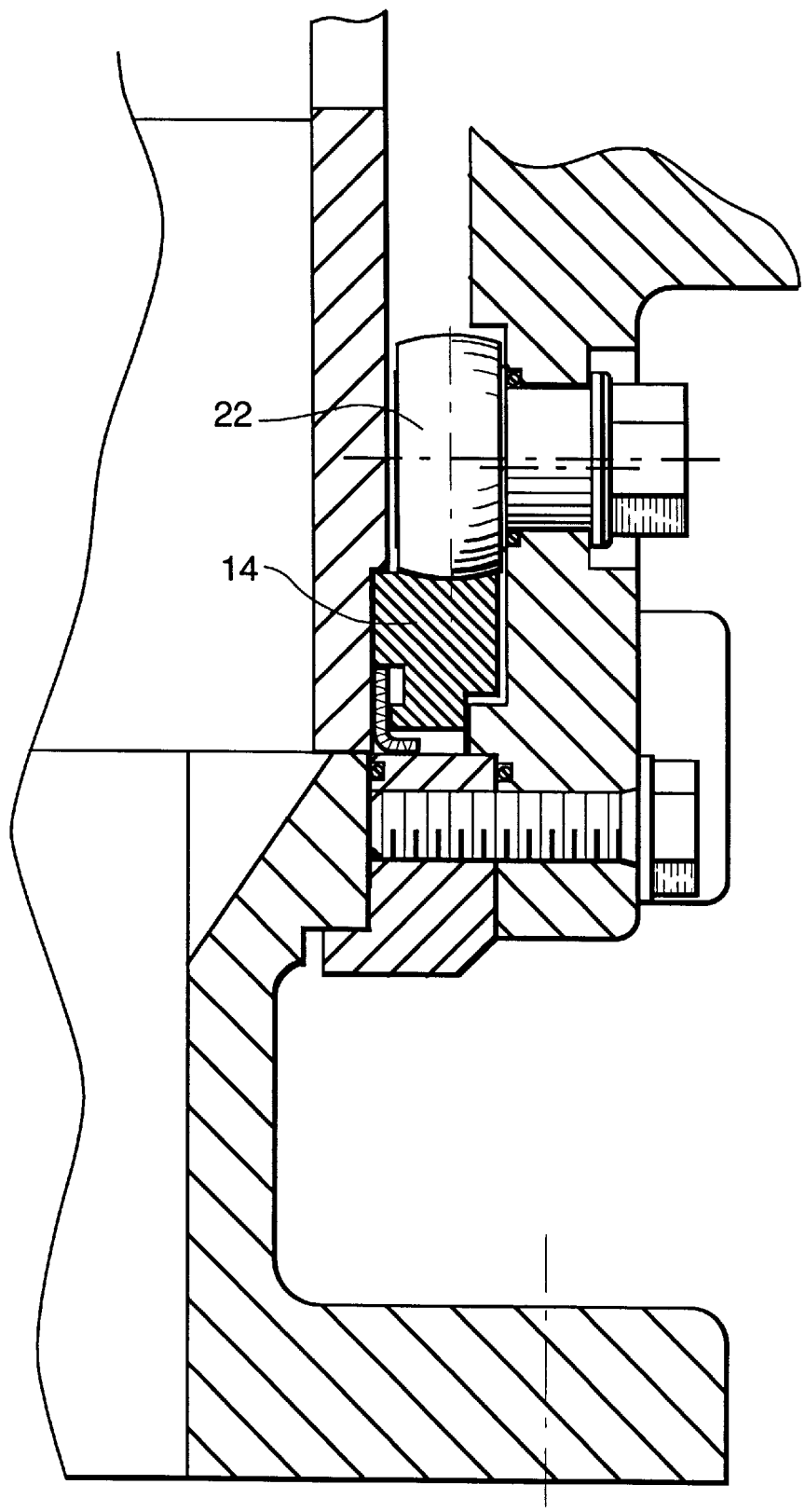
FIG. 9 illustrates another embodiment modified over FIG. 1, with a crowned support roller.

In another embodiment, as shown in FIG. 9, however, it is provided that this support roller 22 is crowned and rolls on a running face of the flange ring 14 that is provided with a groove, in order to achieve additional prestressing in the axial direction.

A spacer ring 17 is also disposed between the side cover 4 and the housing 1; it is secured by screws 18 to the side cover 4, and this spacer ring 17 radially limits the above-described sealing arrangement 19, 20. It may have still other seals as well.

In the bearing of the support roller 22, it is preferred that the support roller not be supported precisely at its center line 24 (which is contemplated in the simplest case according to the invention), but instead is also connected to an eccentric bearing. It is shown here that this support roller 22 is connected to an eccentric collar 23, which is disposed eccentrically to the center line 24 in an eccentric axis 25. The eccentric collar 23 may be rotated at position 26 by a tool, so that the radial location of the support roller 22 is infinitely variable thereby. This adjusts the load-bearing force of the support roller 22 at the flange ring 14.

It can be seen that the support roller 22, in its free position 27, runs between the side cover 4 and the side shell 16 of the cellular wheel 6 and has adequate axial play.

Figure 3:
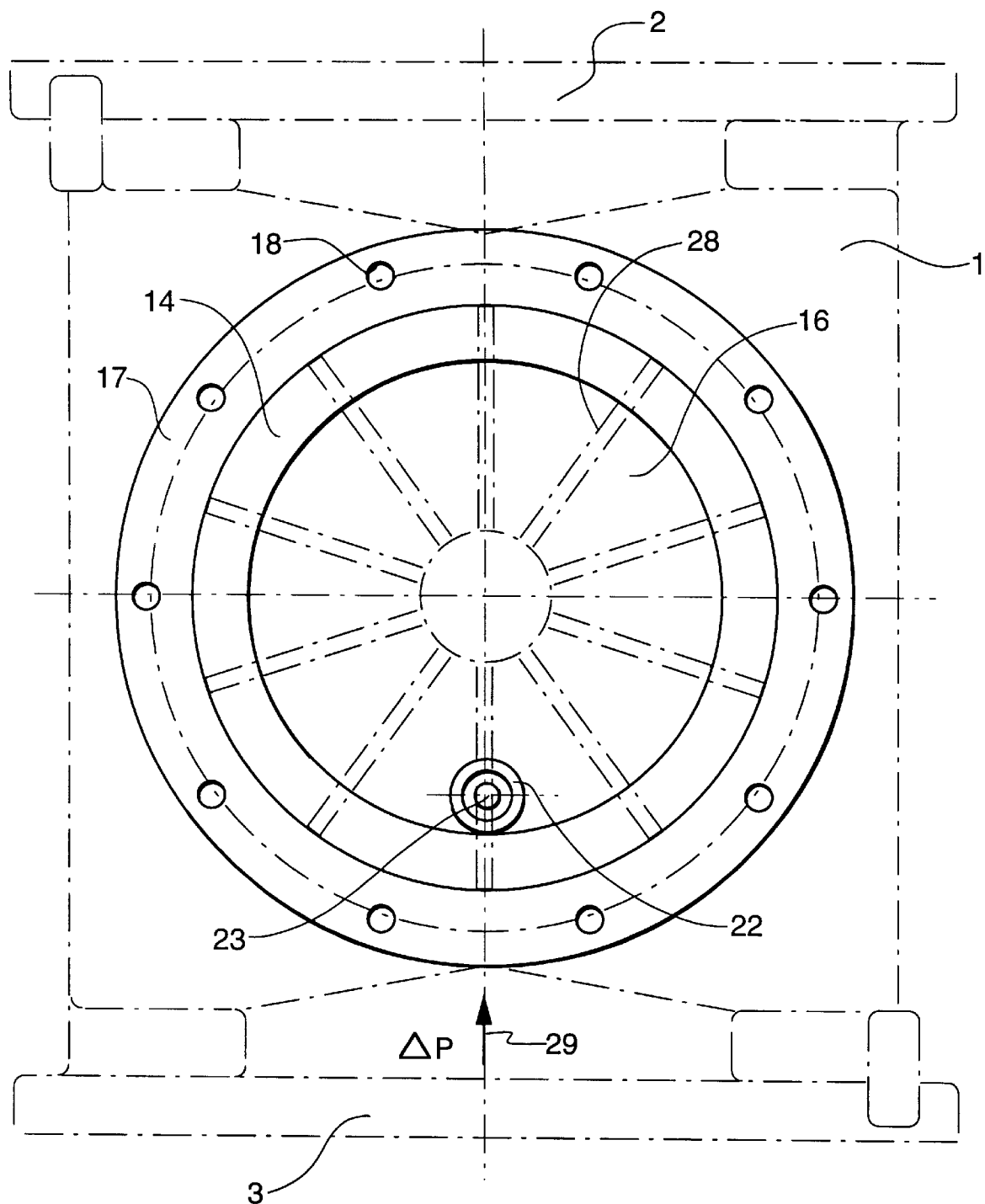
FIG. 3 illustrates a plan view on the support arrangement with the side cover removed.

FIG. 3 shows the side view of FIG. 2 with the side cover 4 removed; it can be seen that the aforementioned support roller 22, with its eccentric collar 23, is disposed in the side of the flange ring 14 toward the outlet 3.

It can also be seen that when the sagging force on the shaft is in the direction of the arrow 29, the support roller 22 counteracts this sagging.

It has been shown above that the eccentric arrangement of the support roller 22 is intended primarily to provide infinitely variable adjustment of the load-bearing force of the support roller 22 on the flange ring 14. In this way, any inaccuracies of manufacture are also compensated for. That is, high-precision bearing of the support roller 22 is unnecessary, because the support roller can still be adjusted afterward anyway.

In a further feature of the invention, however, it can be provided that the support roller 22 is adjusted radially outward eccentrically, in the contrary direction to that of the arrow 29, in such a way that even the shaft 7 is made to sag downward, so that from the outset the narrowest possible air leakage gap can be achieved between the housing and the cellular wheel, and the sagging that occurs later is already counteracted from the outset.

In other words, the sagging of the shaft 7 is preset, and this sagging is made to counteract the sagging to be expected later that occurs under feeding load.

Figure 4:
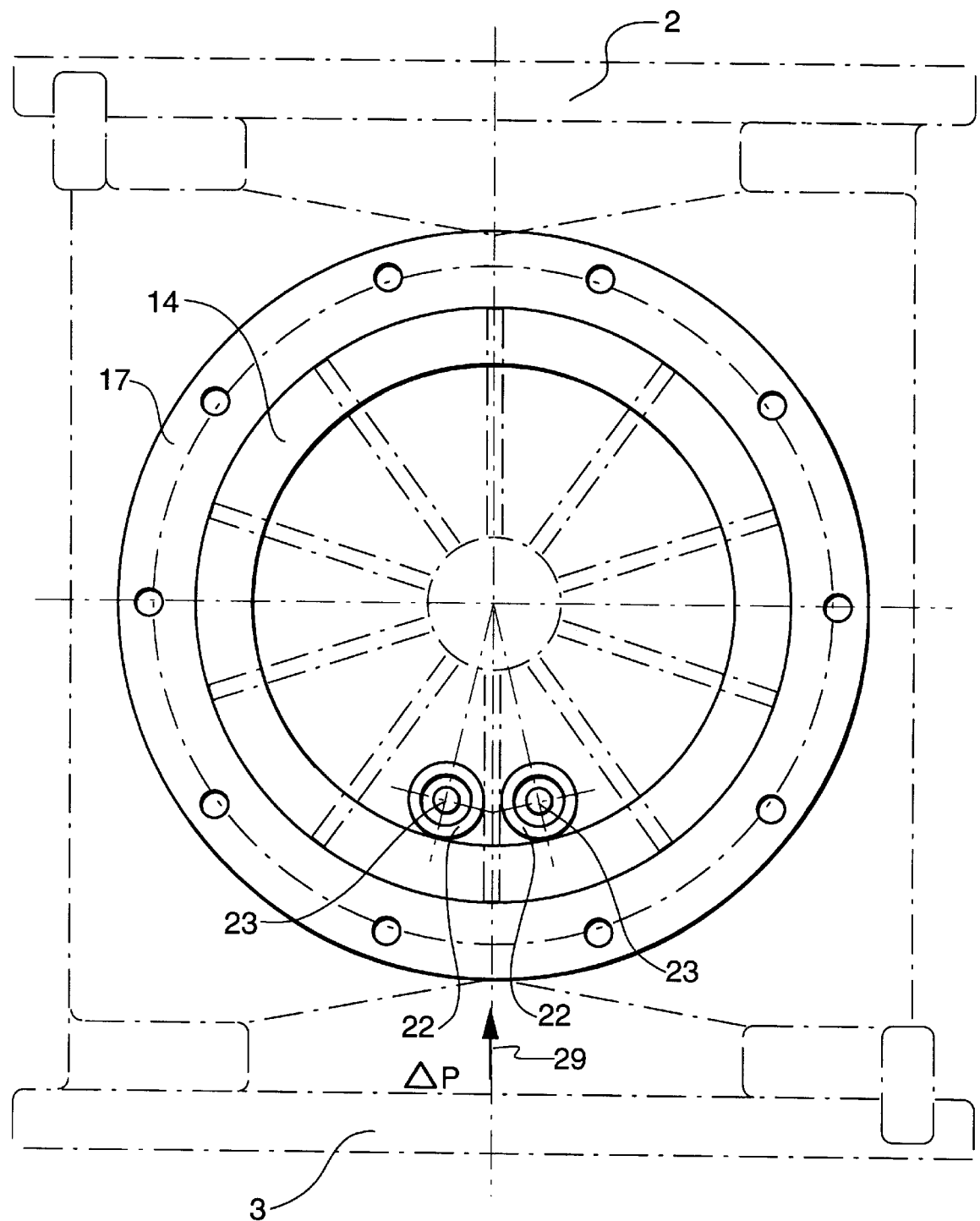
FIG. 4 illustrates an embodiment modified over FIG. 3.

FIG. 4 shows that instead of a single support roller 22, a plurality of support rollers 22 (in this case two support rollers (22) rest in a load-transmitting manner on flange ring 14 on the side toward the outlet 3.

Figure 5:
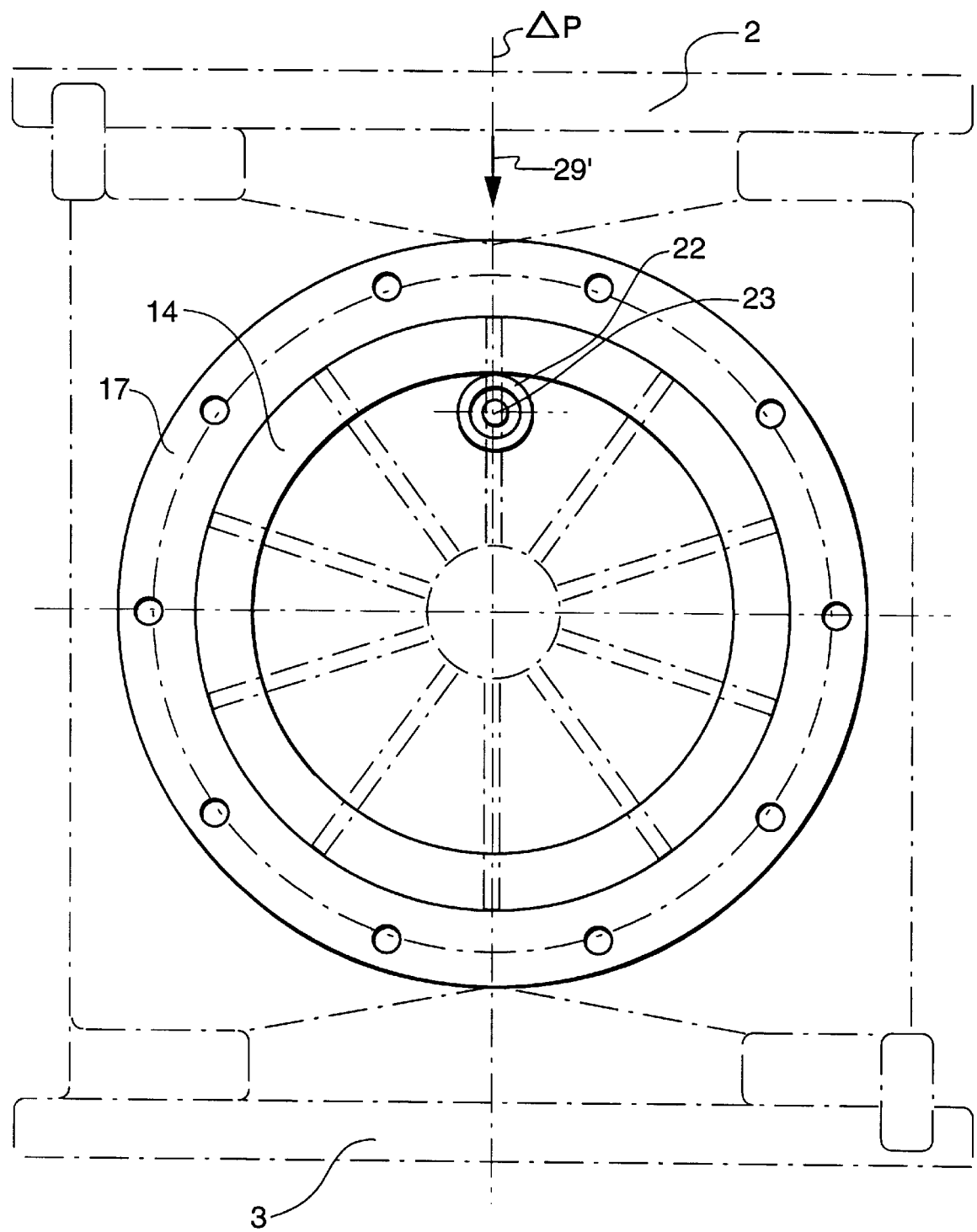
FIG. 5 illustrates another embodiment of FIG. 3.

In some applications it happens as shown in FIG. 5 that the exertion of force is not from below via the outlet 3 in the direction of the arrow 29; instead—as shown in FIG. 5 the exertion of force is from above in the direction of the arrow 29' via the inlet 2. The shaft would then sag in precisely the opposite direction from the sagging cure 36 shown in FIG. 1.

To counteract such sagging, it is provided in accordance with FIG. 5 that one or more support rollers 22 rest in a load-transmitting fashion on the flange ring 3 on the side toward the inlet 2.

Figure 6:
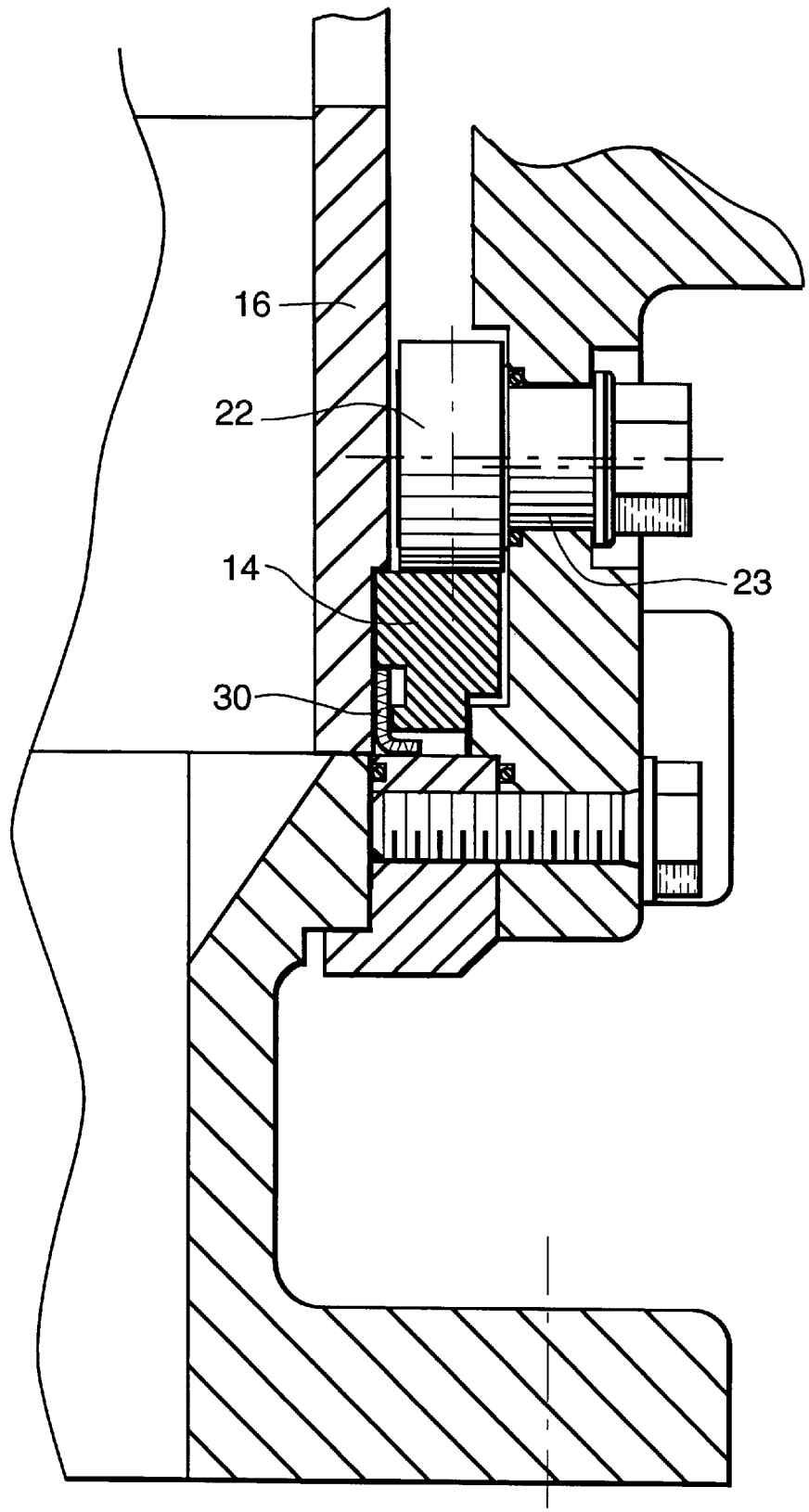
FIG. 6 illustrates a detail similar to II of FIG. 1, with a modification of the seal.

FIG. 6, which shows a modified exemplary embodiment in comparison to FIG. 2, shows a modified seal; it can be seen that instead of the sealing rings 19, 20, a so-called lip seal 30 is used, which substantially comprises a ring bent at a right angle, which on the one hand is encased by its radial leg by the flange ring 14 and on the other rests sealingly with its axial leg on the spacer ring 17.

Figure 7:
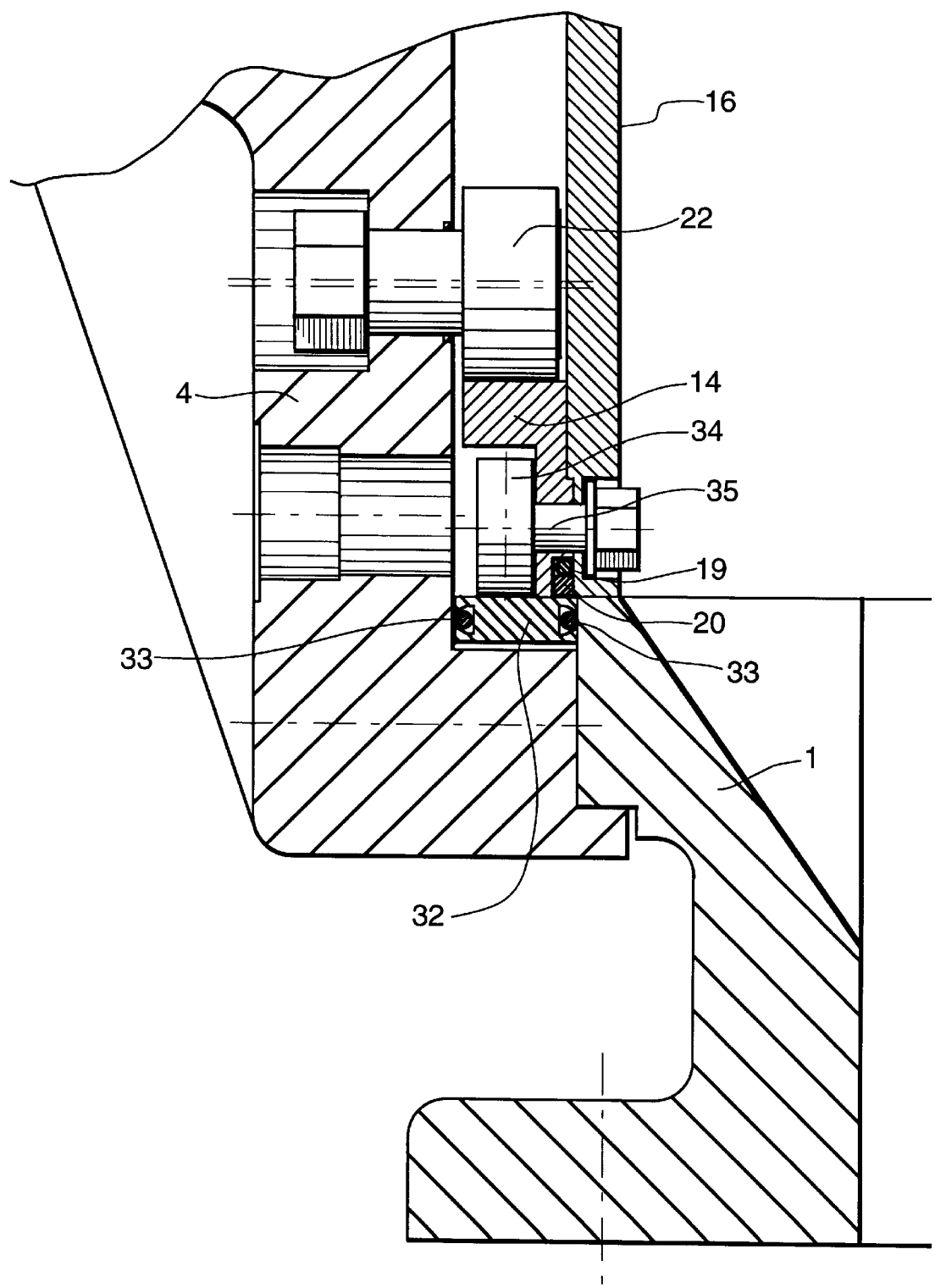
FIG. 7 illustrates an embodiment modified over FIG. 1, with a floatingly supported support ring, in section.
Figure 8:
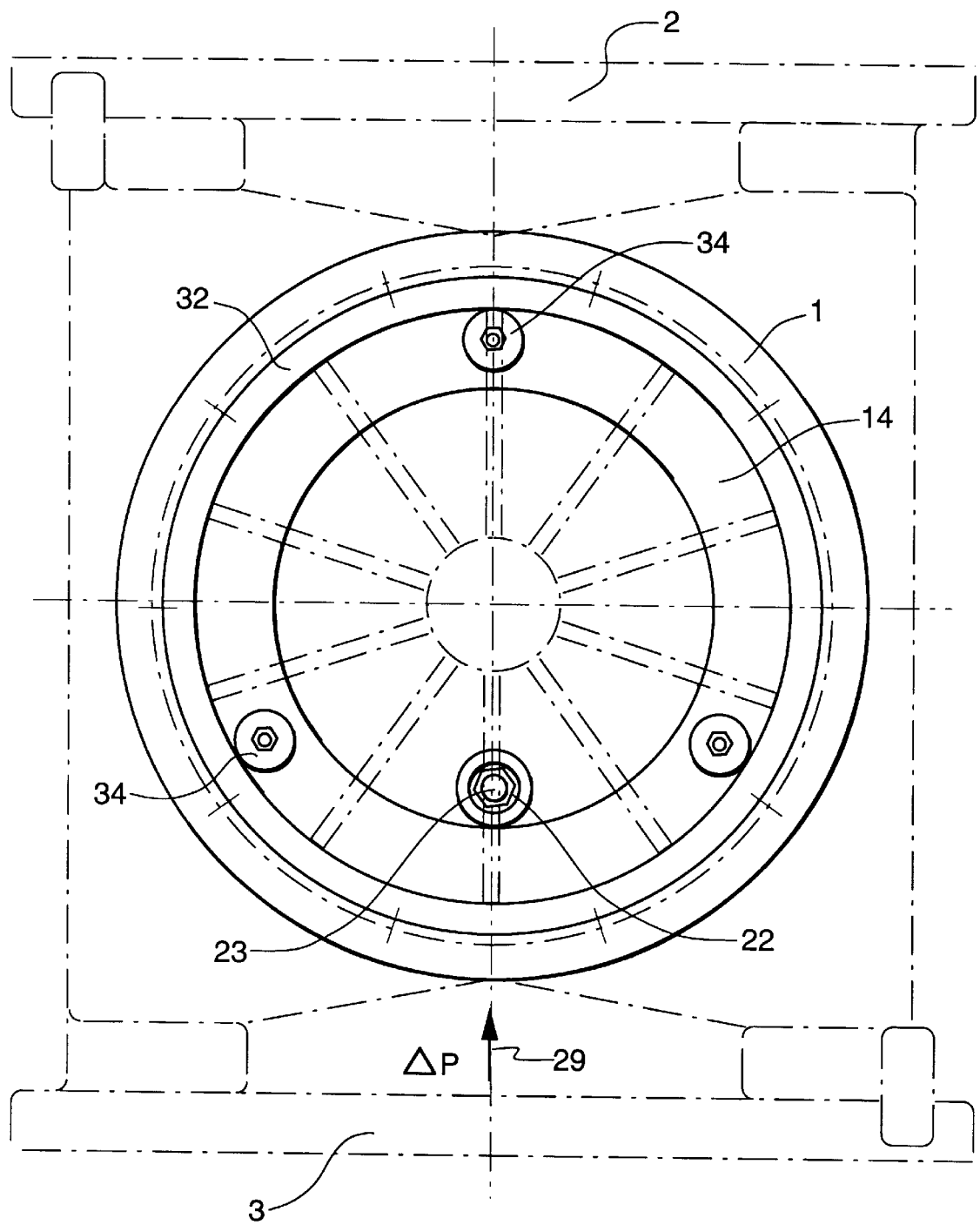
FIG. 8 illustrates larger scale, plan view of the arrangement of FIG. 7.

FIGS. 7 and 8 show a floatingly supported support ring 32, which is sealed off from the side cover 4 and the housing 1 by axial O-rings 33 and is carried by control rollers 34, by associated radially inward-pointing control rollers 34 distributed uniformly over the circumference, which are each adjustable radially eccentrically in eccentric bushes 35. With the disposition of these three control rollers 34, which are secured to the flange ring 14, the advantage is obtained that this rolling position of the floating support ring 32 to the sealing ring 19, 20 that takes on the actual task of sealing is kept constant. An undesired wearing down of this sealing ring arrangement 19, 20 therefore does not occur, since the floating sealing ring 32 rotates with the eccentricity of the cellular wheel 6 and keeps these sealing rings always at a constant sealing cross section. Since the control rollers 34 are secured to the revolving flange ring 14, they revolve with the flange ring and thus support the floating support ring 32 which is stationary.

It is intended that the foregoing be a description of the preferred embodiments, but that the invention be limited solely by that which is within the scope of the intended claims.

We claim:

1. A cellular wheel sluice, comprising a housing having an inlet opening and an outlet opening, side covers, a cellular wheel with struts and side disks, which is mounted on a shaft with bearings, wherein there is at least one flange ring secured to the outside of each side disk of the cellular wheel, on which wheel there rests at least one support roller attached to the housing and radially carrying the flange ring.

2. The cellular wheel sluice of claim 1, wherein one or more support rollers brace the flange ring at the location that in operation represents the overpressure side in the prevailing pressure system.

3. The cellular wheel sluice of claim 2, wherein the one or more support rollers are located adjacent to the side disk of the cellular wheel.

4. The cellular wheel sluice of claim 1, wherein a plurality of support rollers are distributed over the circumference of the housing.

5. The cellular wheel sluice of claim 1 wherein the support rollers are provided with an eccentric adjustability.

6. The cellular wheel sluice of claim 1, wherein the axis of the cellular wheel is disposed eccentrically away from the center of the housing axis.

7. The cellular wheel sluice of claim 1, wherein in that control rollers are disposed on the flange ring.

8. The cellular wheel sluice of claim 1, wherein the support roller is embodied in crowned fashion, and the flange ring has a groove for receiving the support roller.

* * * * *